J. N. WILBUR.
ATTACHMENT FOR MOWING MACHINES.
APPLICATION FILED JULY 2, 1917.
1,281,111.
Patented Oct. 8, 1918.
2 SHEETS—SHEET 1.
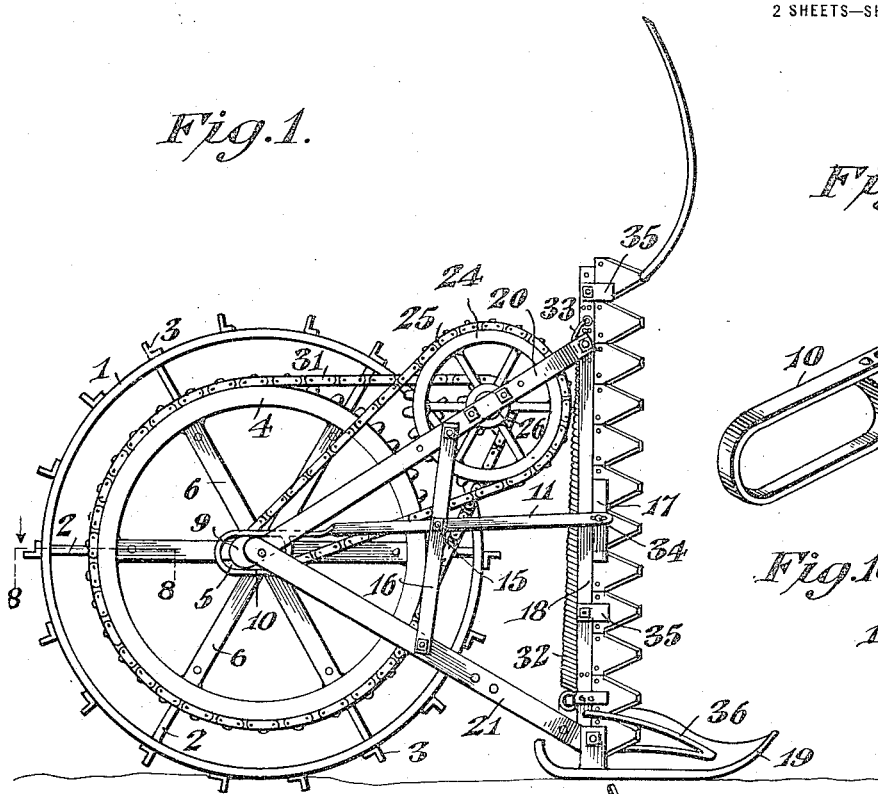
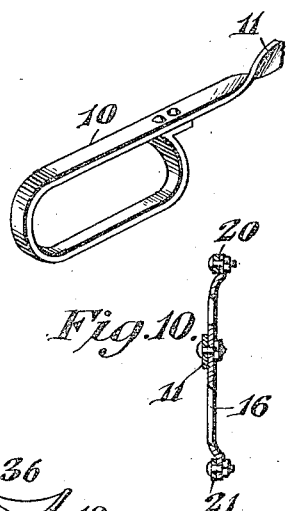
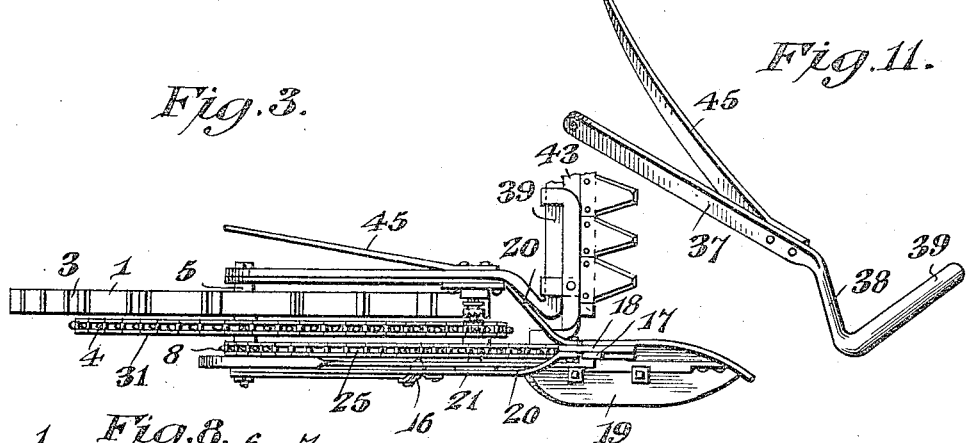
Inventor
J. N. Wilbur,
his Attorneys J. N. WILBUR.
ATTACHMENT FOR MOWING MACHINES.
APPLICATION FILED JULY 2, 1917.
1,281,111.
Patented Oct. 8, 1918.
2 SHEETS—SHEET 2.
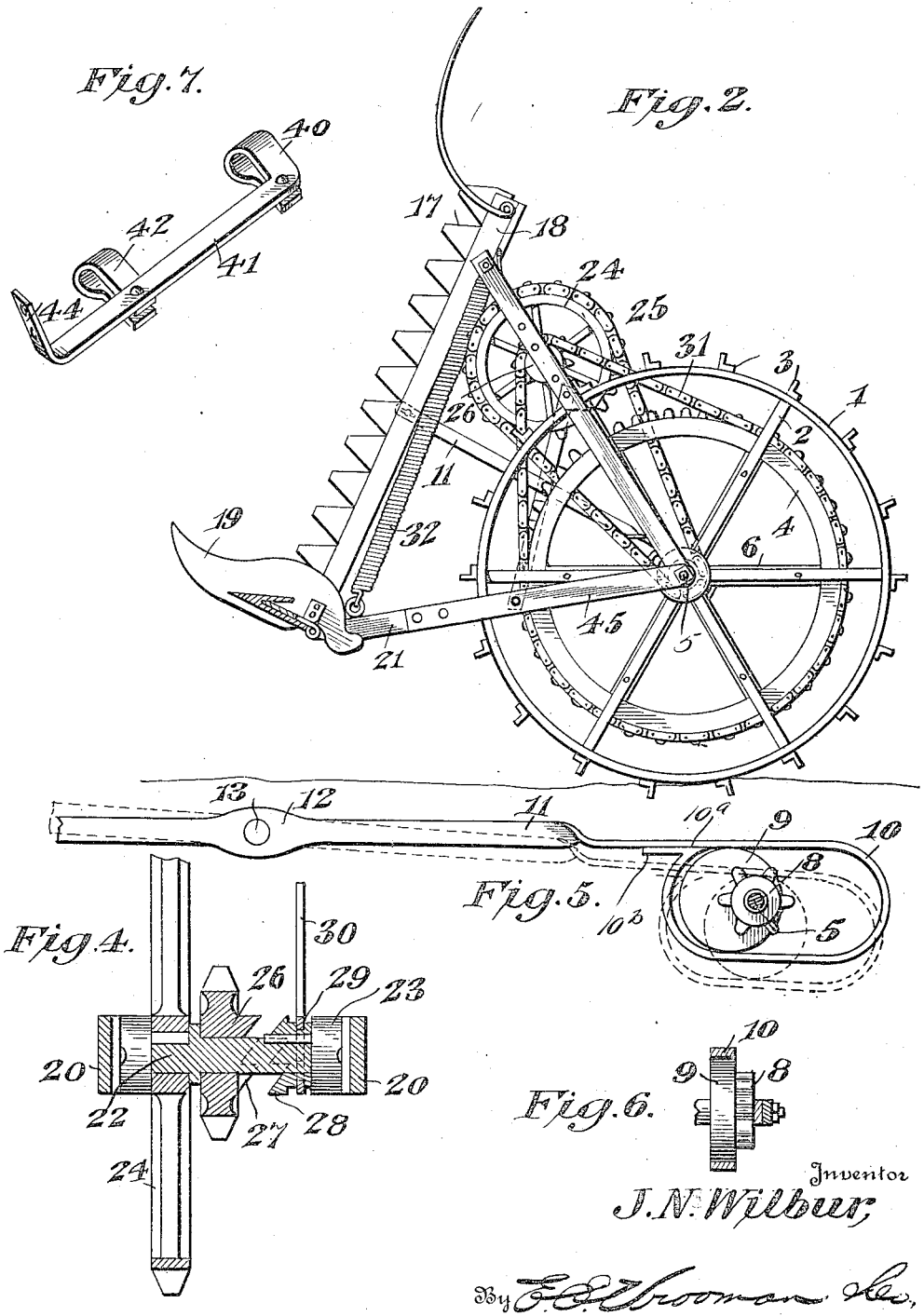

UNITED STATES PATENT OFFICE.

JOHN N. WILBUR, OF TACOMA, WASHINGTON, ASSIGNOR OF ONE-HALF TO JOHN G. MOHRWEIS, OF TACOMA, WASHINGTON.

ATTACHMENT FOR MOWING-MACHINES.

1,281,111.　　　　　Specification of Letters Patent.　　Patented Oct. 8, 1918.

Application filed July 2, 1917. Serial No. 178,285.

*To all whom it may concern:*

Be it known that I, JOHN N. WILBUR, a citizen of the United States of America, residing at Tacoma, in the county of Pierce and State of Washington, have invented certain new and useful Improvements in Attachments for Mowing-Machines, of which the following is a specification, reference being had therein to the accompanying drawing.

This invention relates to a mowing machine and has for its principal object the production of a simple and efficient means for actuating a vertical mower bar independently of the horizontal mower bar which is adapted to coöperate therewith.

Another object of this invention is the production of a simple and efficient driving means for directly driving the vertical mower bar, and also efficiently supporting the same.

With these and other objects in view, this invention consists in general of certain novel combinations, constructions and arrangements of parts as will be hereinafter fully described and claimed.

In the accompanying drawings:

Figure 1 is a side elevation of the vertical mower bar and driving means therefor.

Fig. 2 is a side elevation of the opposite side of the device shown in Fig. 1.

Fig. 3 is a top plan view of the device shown in Fig. 1.

Fig. 4 is a vertical section through the clutch-carrying shaft and sprocket wheels supported thereby.

Fig. 5 is a side elevation of the eccentric bar which is adapted to actuate the mower blade of the mower bar.

Fig. 6 is an end elevation of the eccentric shown in Fig. 5, the operating eccentric bar being shown in section.

Fig. 7 is a detail perspective of the strap which is carried by the horizontal mower bar and to which is secured the brace of the horizontal bar.

Fig. 8 is a section taken on the line 8—8, Fig. 1.

Fig. 9 is a detail perspective of the looped end of the eccentric bar which is adapted to operate the cutting knives of the vertical mower bar.

Fig. 10 is an end elevation, partly in section, of the vertical brace which is adapted to connect the upper and lower bracing bars of the frame of the mower attachment.

Fig. 11 is a detail perspective of the brace and swather secured thereto.

Referring to the accompanying drawings by numerals, it will be seen that 1 designates the driving wheel which is provided with suitable spokes 2 and carries a plurality of transversely-extending angle cleats 3 upon the periphery thereof for the purpose of permitting the cleats to firmly grip the surface of the ground over which the device may be passing.

A large sprocket wheel 4 is carried upon the axle 5 of the wheel 1 and this sprocket wheel 4 is provided with a plurality of radiating spokes 6, which spokes 6 are riveted to the spokes 2 by means of rivets or other suitable fastening means 7, shown in detail in Fig. 8 of the drawings. A primary sprocket wheel 8 is also carried upon the axle 5 of the wheel 1, and this sprocket 8 carries an eccentric disk 9 which is shown in detail in Fig. 5. This eccentric disk 9 is adapted to work within the looped end 10 of the eccentric operating bar 11 and as the axle 5 rotates, the looped end 10 of the operating lever or bar 11 will be moved upwardly and downwardly, such as indicated in dotted lines in Fig. 5 of the drawings; the looped end 10 being formed at the twisted end by bending the bar 11 into a loop and then having it rest flat, at 10$^a$, against the side of the bar (Fig. 5) with an inwardly extending bearing foot 10$^b$. The rear end of the eccentric bar 11 is twisted to present the flattened face thereof for action upon the eccentric disk 9, as shown in Fig. 5, and this bar 11 is provided with an enlarged portion 12 having an aperture 13 formed therein, through which aperture passes a pivot bolt 15 for firmly anchoring the bar 11 upon the vertical brace 16. The outer end of this bar 11 is pivotally connected to the mower knife 17, as is illustrated in Fig. 1 and as will be more clearly described in the following specification.

The vertical mower bar 18 carries a mower cutting blade 17 as above stated, and this bar 18 is supported upon a shoe 19 of suitable construction. A pair of upwardly-inclined side braces 20 are secured to the respective ends of the axle 5 of the wheel 1 and have their forward ends bent together to fit upon the opposite sides of the mower bar 18, as shown in Fig. 3, thereby constituting a brace for the upper end of the mower bar.

This mower bar is also braced near the bottom thereof by means of a pair of downwardly-inclined braces 21, which braces are secured to the respective ends of the axle 5 and have their forward ends brought together so as to fit snugly around the lower end of the mower bar 18 as shown in Fig. 1. These bars 20 and 21 are also braced by means of the vertically-extending brace 16 above described, which brace has its respective ends secured to one of the bars 20 and one of the bars 21 upon the outer side of the mower bar attachment.

A clutch supporting shaft 22 is supported between the upwardly-inclined brace bars 20 and has its respective ends seated in the sockets 23 carried upon these upwardly-inclined braces 20, as shown clearly in Fig. 4 of the drawing. A sprocket wheel 24 is keyed to the shaft 22 and this sprocket wheel 24 supports a sprocket chain 25, which sprocket chain 25 passes over the sprocket wheel 8 previously described for the purpose of operating the eccentric disk 9. A loosely-mounted sprocket wheel 26 is carried by the clutch shaft 22 and this sprocket 26 is provided with a plurality of clutch teeth 27 formed upon the outer face thereof, which clutch teeth are adapted to be engaged by the clutch teeth 28 formed upon the inner face of the sliding clutch 29. This sliding clutch 29 is keyed to the shaft 22 and may be shifted by means of a suitable clutch lever 30, shown in Fig. 4. It should be understood that these clutch teeth 27 and 28 are so arranged as to cause the sprocket wheel 26 to be driven when the machine is operated in a forward direction, and also cause the clutch teeth to disengage when the machine is operated in a rearward direction—that is to say, of course, when the clutch has been thrown to an operative position.

By carefully considering Figs. 1 and 2 of the drawings, it will be seen that the main sprocket 4 carries a sprocket chain 31 which sprocket chain 31 passes over the sprocket 26 for continuously driving this sprocket while the machine is in operation.

A vertical coiled spring 32 is connected to the vertical mower bar 18 near the lower end thereof and this coil spring 32 is connected at its upper end by means of the loop 33 to the cutter blade 17 of the vertical mower bar, thereby assisting in drawing the cutter blade to its downward position after it has been moved upwardly by means of the operating eccentric arm 11. This operating eccentric arm 11 is connected to the cutter blade 17, as illustrated clearly in Fig. 1, by means of a pivot pin 34, and a suitable number of guiding brackets 35 are carried by the mower bar 18 and overhang the cutter blade 17 of the bar. A suitable guard 36 is carried by the shoe 19 as shown in Fig. 1, and overhangs the lower end of the vertical mower bar.

A bracing arm 37 is secured to the inner end of the axle 5 and this bracing arm 37 is provided with an offset end 38 which terminates in a right-angularly extending stub shaft 39. This right-angularly extending stub shaft 39 passes through the primary loop 40 of the securing strap 41 and also through the auxiliary loop 42 carried by the strap 41. This strap 41 is securely anchored upon the horizontal mower bar 43 and the looped portions 40 and 42 thereof project beyond the rear edge of the mower bar 43. This strap 41 is provided with an angularly-extending end 44, which angularly-extending end 44 is securely fastened to the inner face of the shoe 19, as shown in Fig. 3, thereby constituting an efficient means for securing the horizontal mower bar 43 in engagement with the shoe 19. It will, however, be clearly seen that by securing the brace 37 to the horizontal mower bar 43, as shown in Fig. 3, the horizontal mower bar, as well as the vertical mower bar, may be lifted or raised to the desired position while the device is being moved from place to place. This raised position is indicated clearly in Fig. 2 of the drawings. A suitable swather blade 45 is secured to the inner face of the brace 37.

The operation of the device is as follows:

As the attachment moves in a forward direction, the driving wheel 1 of course will rotate, thereby imparting rotary movement to the sprocket 4. This sprocket 4 will in turn rotate the sprocket chain 31, and thereby drive the sprocket wheel 26. When it is desired to operate the mower blade or cutter blade 17, the clutch 29 may be thrown to an operative position for engaging the sprocket wheel 26 and in this manner, the sprocket wheel 24 will be driven, thereby driving the chain 25 and in turn driving the sprocket wheel 8. By driving the sprocket wheel 8, it should be understood, that the eccentric disk 9 will be actuated, thereby swinging the eccentric bar 11 and reciprocating the cutter blade 17.

What is claimed is:—

1. A device of the class described comprising a driving wheel, a vertical mower bar, a cutting blade carried by said vertical mower bar, a plurality of bracing arms carried by said wheel and diverging toward their outer ends and being secured to said vertical mower bar, an eccentric operated lever pivotally mounted between said bracing arms, said eccentric operated lever connected to said cutting blade and adapted to actuate the same, said eccentric operating arm twisted at one end and the twisted end bent into a looped end, and an eccentric working within said looped end and adapted to swing said arm as said driving wheel is rotated for reciprocating said cutting blade upon said mower bar.

2. A device of the class described comprising a driving wheel, a vertical mower bar, a cutting blade carried by said vertical mower bar, a plurality of bracing arms carried by said wheel and diverging toward their outer ends and being secured to said vertical mower bar, an eccentric operated lever pivotally mounted between said bracing arms, said eccentric operated lever connected to said cutting blade and adapted to actuate the same, said eccentric operating arm bent into a looped end, an eccentric working within said looped end and adapted to swing said arm as said driving wheel is rotated for reciprocating said cutting blade upon said mower bar, and clutch means coöperating with said eccentric for permitting the same to be actuated at selected intervals.

3. A device of the class described comprising a driving wheel, a sprocket carried by said driving wheel, an axle supporting said sprocket, and driving wheel, a second sprocket loosely mounted upon said axle, an eccentric disk carried by said second sprocket, an eccentric operated lever provided with a looped end, said eccentric disk working within said looped end for swinging said lever, a frame carried by said axle and engaging said vertical mower bar, said eccentric lever being pivotally mounted upon said frame, a cutter blade carried by said vertical mower bar, and said eccentric operated lever engaging said cutter blade and adapted to reciprocate the same.

4. A device of the class described comprising a driving wheel, a sprocket carried by said driving wheel, an axle supporting said sprocket and driving wheel, a second sprocket loosely mounted upon said axle, an eccentric disk carried by said second sprocket, an eccentric operated lever provided with a looped end, said eccentric disk working within said looped end for swinging said lever, a frame carried by said axle and engaging said vertical mower bar, said eccentric lever being pivotally mounted upon said frame, a cutter blade carried by said vertical mower bar, said eccentric operated lever engaging said cutter blade and adapted to reciprocate the same, a spring carried by the lower end of said vertical mower bar and engaging the upper end of said cutter blade for normally holding the cutter blade in a retracted position.

5. A mower attachment of the class described comprising a driving wheel, a frame, an axle carried by said driving wheel, said frame being fixed to said axle and comprising a plurality of diverging forwardly-extending arms, a vertical mower bar engaging said arms and being supported in its vertical position by means of said arms, a driving sprocket carried by said driving wheel, a loosely mounted sprocket carried by said shaft, a clutch shaft carried by said frame, said clutch shaft carrying a fixed sprocket and a loose sprocket, a clutch keyed to said clutch shaft and adapted to be thrown into engagement with said loose sprocket for causing said fixed sprocket to rotate with said loose sprocket, a chain passing around said driving sprocket and said loose sprocket for continuously rotating said loose sprocket, and a chain passing around said fixed sprocket and around said loose sprocket carried by said first-mentioned shaft for rotating said eccentric while said driving wheel is being driven forwardly.

6. A device of the class described comprising a driving wheel, a vertical mower bar, a shoe, cutting means carried by said vertical mower bar, means for actuating said cutting means, a frame supporting said vertical mower bar in engagement with said driving wheel, a horizontal mower bar, means for connecting said horizontal mower bar to said shoe, and a bracing member connected to said driving wheel and being secured to the rear of said horizontal mower bar for facilitating the raising and lowering of the outer end of said horizontal mower bar.

7. In combination with a horizontal mower bar, a vertical mower bar, a shoe, of a securing strap carried by said horizontal mower bar and provided with an offset end secured to said shoe, said strap provided with a plurality of rearwardly-extending loops, a bracket arm, a driving wheel provided with a shaft, said bracket arm secured to said shaft, said bracket arm provided with an offset end having a laterally-extending stub shaft, said laterally-extending stub shaft passing through said loops of said strap for firmly connecting said horizontal mower bar to the shaft of said driving wheel.

8. A device of the class described, comprising a driving wheel, a vertical mower bar, a cutting blade carried by said vertical mower bar, a plurality of bracing arms carried by said wheel and secured to said vertical mower bar, an operated lever pivotally mounted between said bracing arms, said lever being provided with a twisted portion and with a loop formed near said twisted portion, the inner end of said loop resting flat against a side of said lever and provided with an inwardly extending bearing foot, an eccentric working in said looped end, means coöperating with said drive wheel and said eccentric, for operating said eccentric, and said eccentric operating said lever for reciprocating said cutter blade upon said mower bar.

In testimony whereof I hereunto affix my signature.

JOHN N. WILBUR.